UNITED STATES PATENT OFFICE.

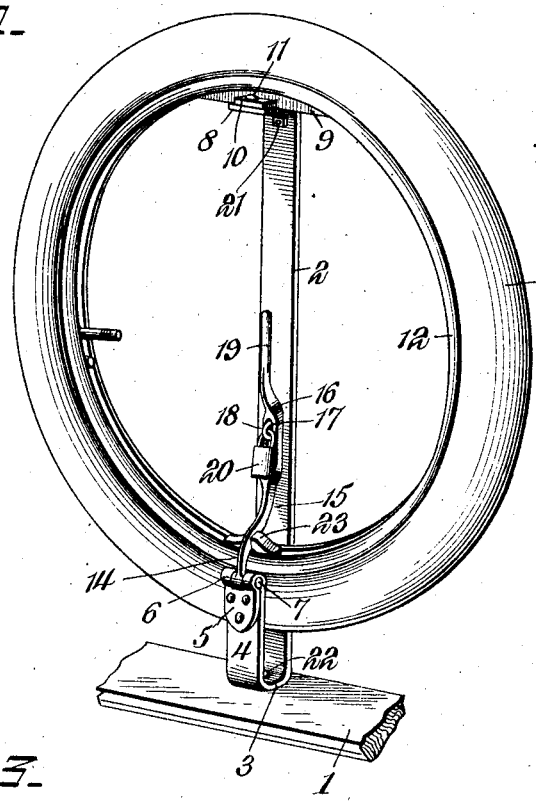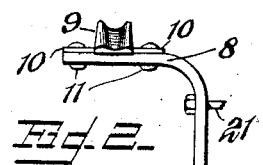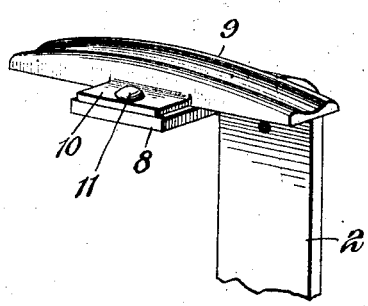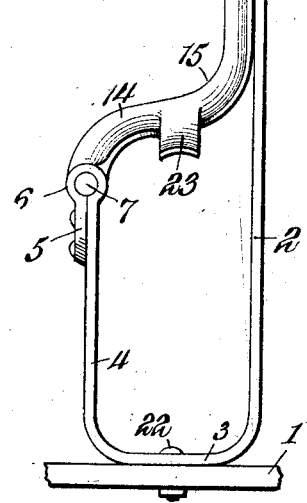

ROE STUBBS FREEMAN, OF ATLANTA, GEORGIA.

TIRE-RACK.

1,378,778.  Specification of Letters Patent.  Patented May 17, 1921.

Application filed July 12, 1919. Serial No. 310,327.

*To all whom it may concern:*

Be it known that I, ROE STUBBS FREEMAN, a citizen of the United States, residing at Atlanta, in the county of Fulton and State of Georgia, have invented a new and useful Tire-Rack, of which the following is a specification.

This invention has reference to spare-tire racks for automobiles, and its object is to provide a rack in which the tire may be readily mounted and from which it may be readily taken, and which is especially adapted for sustaining a tire applied to a demountable rim, the tire itself at no point being subjected to compressive weight.

In accordance with the invention there is provided a metal post attachable to one of the running boards of the automobile and rising alongside of the body of the vehicle to an appropriate height. In spaced relation to the post is another, shorter, post sufficiently distant from the first post to permit the introduction of a tire between them, and the second or shorter post carries a lock lever which may be brought into engagement with or into close relation to the first post. At the upper end of the long post there is provided a saddle on which is sustained the rim carrying the tire, and the lock lever is provided with a block so arranged as to bear against the inner surface of the rim in such manner that the rim is clamped between the saddle and block, thereby preventing side-swaying, the arrangement being such that the tire is pendently supported from the saddle and is nowhere upheld by any underneath support.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is a perspective view of the tire rack with a demountable rim having a tire thereon and sustained by and locked on the support.

Fig. 2 is a side elevation of the rack alone, showing some parts in section.

Fig. 3 is a perspective view of the saddle end of the rack.

Referring to the drawing there is shown a small portion 1 of the running board of an automobile. Secured to the running board 1 is an upright post 2 which may be conveniently made of a bar of strap iron or steel of suitable gage and rising to an appropriate height. At the lower end the post 2 is formed into a yoke 3 from which there rises a short upright 4 having a portion 5 returned upon itself to form a hinge member 6 traversed by a hinge pintle 7.

The upper end of the post 2 has an overhang bent portion 8 which may be substantially parallel with the yoke end 3 and the overhang 8 carries a block 9 suitably curved to serve as a saddle. The block 9 is provided on opposite sides with ears 10 secured to the overhang 8 by rivets 11 or in any other appropriate manner. The block 9 is shaped and appropriately curved to underride and sustain a demountable rim 12 for an automobile tire 13, the rim and tire being of customary construction. The tire 13 is designed to serve as an extra tire, usually termed a spare, so as to be ready for substitution for any one of the set of tires in use. Secured to the hinge member 6 by the hinge pintle 7 is one end 14 of a lever 15, the hinged end of the lever being appropriately bent so that the main portion 16 of the lever, which portion is straight, will lie flat against the post 2 on the face thereof toward the upright 4 but above the upright 4. The straight portion 16 of the lever 15 is provided with a longitudinal slot 17 to pass an eye 18 secured to and projecting from the post 2. That end of the straight portion 16 of the lever remote from the hinge 7 has an offset handle extension 19 so that when the main portion or body 16 of the lever is against the post 2 the handle 19 may be readily grasped by the hand. The eye 18 is designed to be traversed by a lock 20 of any suitable construction.

Adjacent to the overhang 8 the post 2 is traversed by a brace rod 21 which may in turn be secured to an appropriate part of the body of the vehicle, which body is not shown in the drawing. When the post is made fast to the vehicle by a bolt or rivet 22 traversing the yoke 3 and the running board 1, and by the rod 21 at the upper end of the post, there is provided a rigid support for the tire 13 on the rim 12. On placing the rim 12 on the rack it is applied to the saddle 9 so as to hang pendently therefrom, the saddle underriding the rim, and the parts are so proportioned that the lower portions of the spare tire and rim enter between the post 2 and upright 4. In order to firmly hold the rim 12 on the saddle 9, the end 14 of the lever 15 is formed with a clamping block 23 shaped in conformity with the usual groove formed in the inner face of the rim, thereby centralizing the rim with reference to the post 2 and upright 4 and acting, together with the saddle 9, as a clamp. This prevents sidewise swaying or circumferential creeping of the spare tire under conditions of travel.

In a vehicle equipped with the invention, should it become necessary to remove a spare tire mounted on the rack, it is only necessary to unlock the lever 15, whereupon it may be readily moved on the pintle 7 out of the way, the lever usually occupying position within the margins of the rim 12. Then the rim and tire may be readily lifted from the saddle 9 and utilized as desired. The damaged tire may be quickly substituted for the good tire in the usual manner on making emergency road changes of tires.

The invention provides a single diametric post with a single support at the upper end for carrying the tire pendently, and a clamp member near the lower end for engaging the inner portion of a demountable rim carrying the tire. The whole device is of simple construction contributing to cheapness of manufacture without in any manner affecting the strength of the device or its efficiency.

What is claimed is:—

1. A tire rack for attachment to an automobile in an upright position, comprising a post with an overhang end and a saddle fast thereto, said post having a yoke portion at the end remote from the saddle and a return portion continued from the yoke portion in spaced parallel relation to the post, a lever pivotally mounted on the return portion and movable into engagement with the post, said lever carrying means in coactive relation to the saddle and spaced therefrom to engage the inner portion of a demountable rim when the diametrically opposite portion of the rim is pendently hung from the saddle, and means for fastening the lever to the post to lock the rim on the rack.

2. A tire rack comprising a post with an overhang at one end, a yoke at the other end and a return portion of less length than the post in spaced parallel relation to said post and all formed in one piece, a saddle carried by the overhang of the post, a lever carried by the return portion of the post and provided with a block diametrically opposite the saddle whereby the saddle and block may be positioned to clamp a demountable rim between them, said lever being movable toward the post, and locking means for holding the lever to the post in clamping relation to a demountable rim.

3. A tire rack comprising a post with an overhang at one end, a yoke at the other end and a return portion of less length than the post in spaced parallel relation to said post and all formed in one piece, a saddle carried by the overhang of the post, a lever carried by the return portion of the post and provided with a block diametrically opposite the saddle, whereby the saddle and block may be positioned to clamp a demountable rim between them, said lever being movable toward the post, and locking means for holding the lever to the post in clamping relation to a demountable rim, the spacing of the post and return portion thereof being such as to receive between them a demountable rim hanging pendently from the saddle and a pneumatic tire mounted on the rim.

4. A tire rack comprising a post with an over-hang at one end and formed at the other end into a yoke with an extension of shorter length than and in spaced parallel relation to the post, a saddle supported by the overhang and having a supporting surface for a demountable rim conforming in curvature to the inner face of the latter to pendently support a rim and tire thereon with the lower portion of the tire lodged between the post and the extension of the yoke, a lever hinged to the upper end of the yoke extension, said lever being provided with a block to engage the rim at a point diametrically opposite from the saddle, said lever having a body portion for movement against the post and there slotted and terminating at the end remote from the hinge in a handle, and an eye fast to and projecting from the post to receive a lock.

5. A tire rack comprising an upright post; means at one end of the post for underriding a demountable rim having a tire thereon; a yoke at the other end of the post; a return portion joined to the yoke and spaced from the post; the return portion, the yoke and the lower part of the post loosely embracing the tire when in position, and said yoke being spaced from the tread of the tire; a lever pivoted to the return portion and having a portion bent inward relative to the post; and a block mounted on the lever in such a position that it is brought into engagement with the inner face of the rim at a point substantially on a level with the pivot of the lever by movement of the lever in juxtaposition to the post.

In testimony that I claim the foregoing as my own I have hereto affixed my signature.

ROE STUBBS FREEMAN.

Witnesses:
A. J. ARMOUR,
F. B. DAVENPORT.